United States Patent [19]
Wilkinson

[11] Patent Number: 5,422,913
[45] Date of Patent: Jun. 6, 1995

[54] HIGH FREQUENCY MULTICHANNEL DIVERSITY DIFFERENTIAL PHASE SHIFT (DPSK) COMMUNICATIONS SYSTEM

[75] Inventor: Robert Wilkinson, Hampshire, England

[73] Assignee: The Secretary of State for Defence in Her Britannic Majesty's Government of the United Kingdom of Great Britain and Northern Ireland, London, England

[21] Appl. No.: 961,887
[22] PCT Filed: Apr. 30, 1991
[86] PCT No.: PCT/GB91/00682
 § 371 Date: Jan. 11, 1993
 § 102(e) Date: Jan. 11, 1993
[87] PCT Pub. No.: WO91/18458
 PCT Pub. Date: Nov. 28, 1991

[30] Foreign Application Priority Data

May 11, 1990 [GB] United Kingdom ............... 9010637

[51] Int. Cl.[6] .......................... H04B 7/02; H04L 1/02
[52] U.S. Cl. ..................................... 375/347; 375/260; 455/303
[58] Field of Search .................. 375/38, 53, 54, 57, 375/67, 85, 86, 58, 100, 102; 329/304; 332/103, 108; 455/303, 306, 135, 137

[56] References Cited

U.S. PATENT DOCUMENTS

| | | | |
|---|---|---|---|
| 3,980,945 | 9/1976 | Bickford | 375/57 |
| 4,168,397 | 9/1979 | Bradley | 375/53 |
| 4,214,209 | 7/1980 | Baier et al. | 375/57 |
| 4,419,766 | 12/1983 | Goeken et al. | |
| 4,509,051 | 4/1985 | Lewis | 375/57 |
| 4,566,100 | 1/1986 | Mizuno et al. | 375/86 |
| 4,606,047 | 8/1986 | Wilkinson | 375/7 |
| 4,628,517 | 12/1986 | Schwarz et al. | |
| 4,715,048 | 12/1987 | Masamura | 375/100 |
| 5,005,209 | 4/1991 | Kung et al. | |
| 5,048,057 | 9/1991 | Saleh et al. | 375/58 |
| 5,109,392 | 4/1992 | McDonald | 375/85 |
| 5,140,615 | 8/1992 | Jasper | 375/100 |
| 5,203,023 | 4/1993 | Saito et al. | 375/100 |

FOREIGN PATENT DOCUMENTS

| | | |
|---|---|---|
| 0065764 | 12/1982 | European Pat. Off. . |
| 0309855 | 4/1989 | European Pat. Off. . |
| 3338510A1 | 5/1985 | Germany . |
| 2161244 | 1/1986 | United Kingdom . |

*Primary Examiner*—Stephen Chin
*Assistant Examiner*—Timothy J. May
*Attorney, Agent, or Firm*—Nixon & Vanderhye

[57] ABSTRACT

A high frequency transmitter comprises a large number of narrowband channels spaced over a broad bandwidth transmission. In one arrangement input data to be transmitted is demultiplexed (1101) so that sections of data are transmitted in groups of channels at 50 baud (say), each 50 baud channel produces a number of diversity channels modulated using difference phase shift key (DPSK) (103) and then added (105) for transmission. In the receiver, coherent summation (803) of close-bunched channels can be used and semi-coherent channel addition (805) can be used across the complete bandwidth. The received signal is convened to digital form then processed by an FFT circuit to produce frequency bins corresponding to the transmitted diversity channel frequencies. DPSK demodulation is carried out and running averages are carried out in each channel to determine the proportion of times that the phase difference falls within allowed limits (907). A discrimination level (908) determines whether individual channels should be excised (914) because of noise corruption. The remaining channels in groups are then added together to determine each data bit received, in semi-coherent addition (905), the measured phase vectors are added vectorially and the vector sum is used to determine the data bit. In a second arrangement the channels of any one group are arranged in bunches of about 10 spread over a bandwidth of about 2 kHz (the experimentally determined coherence bandwidth) with the bunches spread over the whole transmission bandwidth. The bunch channels are added coherently and the resultants are added semi-coherently as before to determine the group data. The group data is then multiplexed to reproduce the high data rate input data. The arrangement allows high data rates to be transmitted with each of the diversity channels carrying only 50 baud.

24 Claims, 11 Drawing Sheets

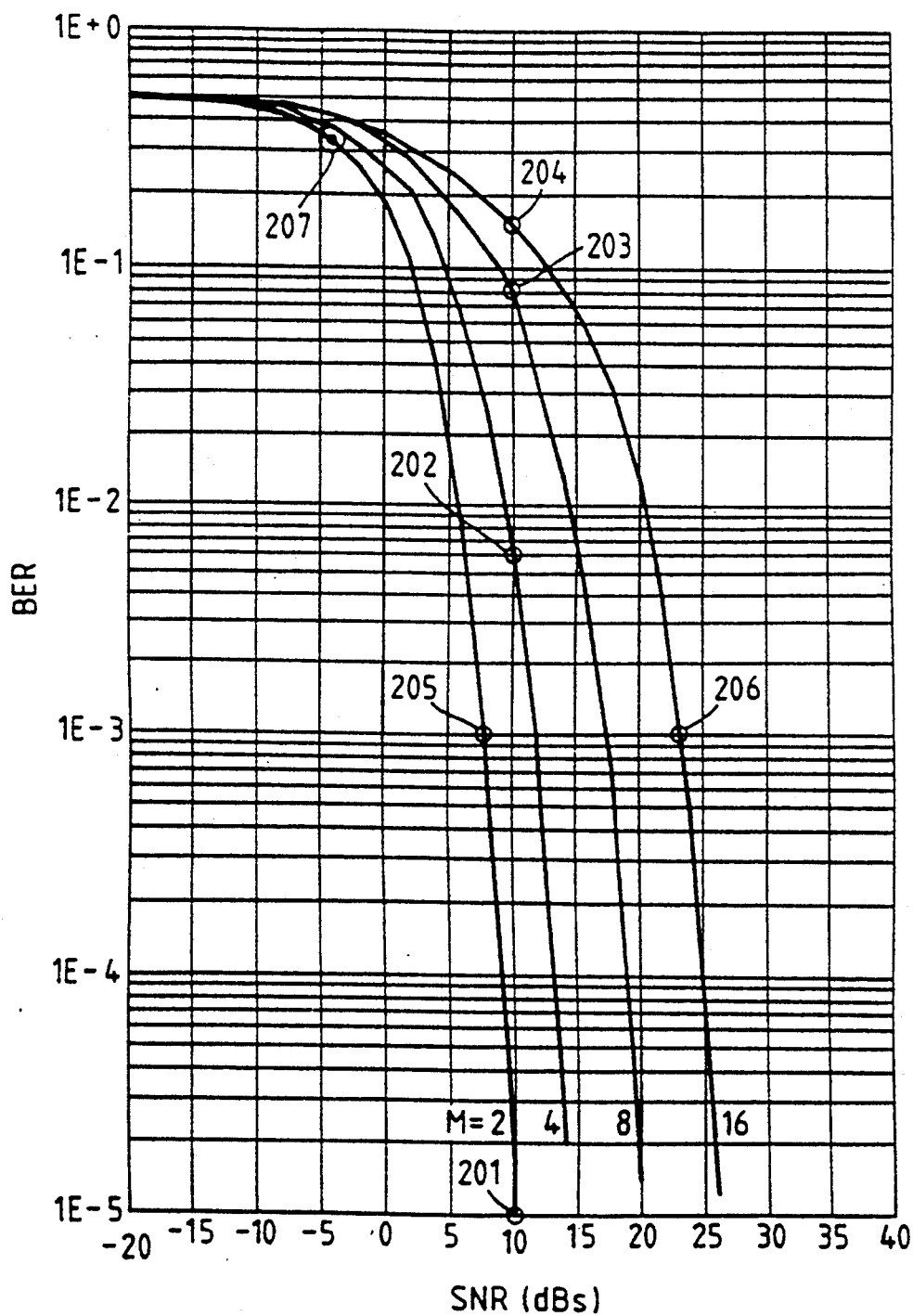

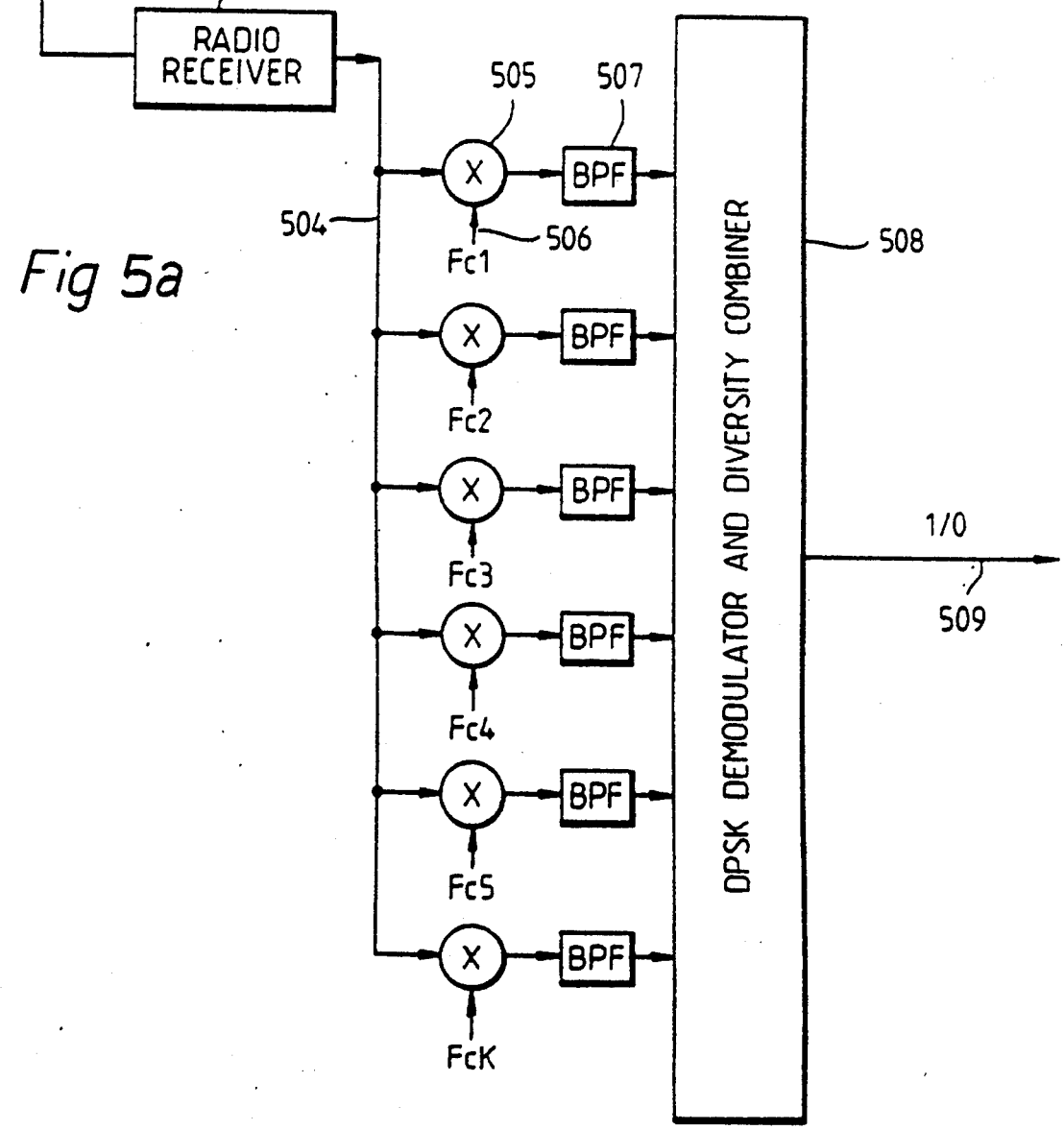

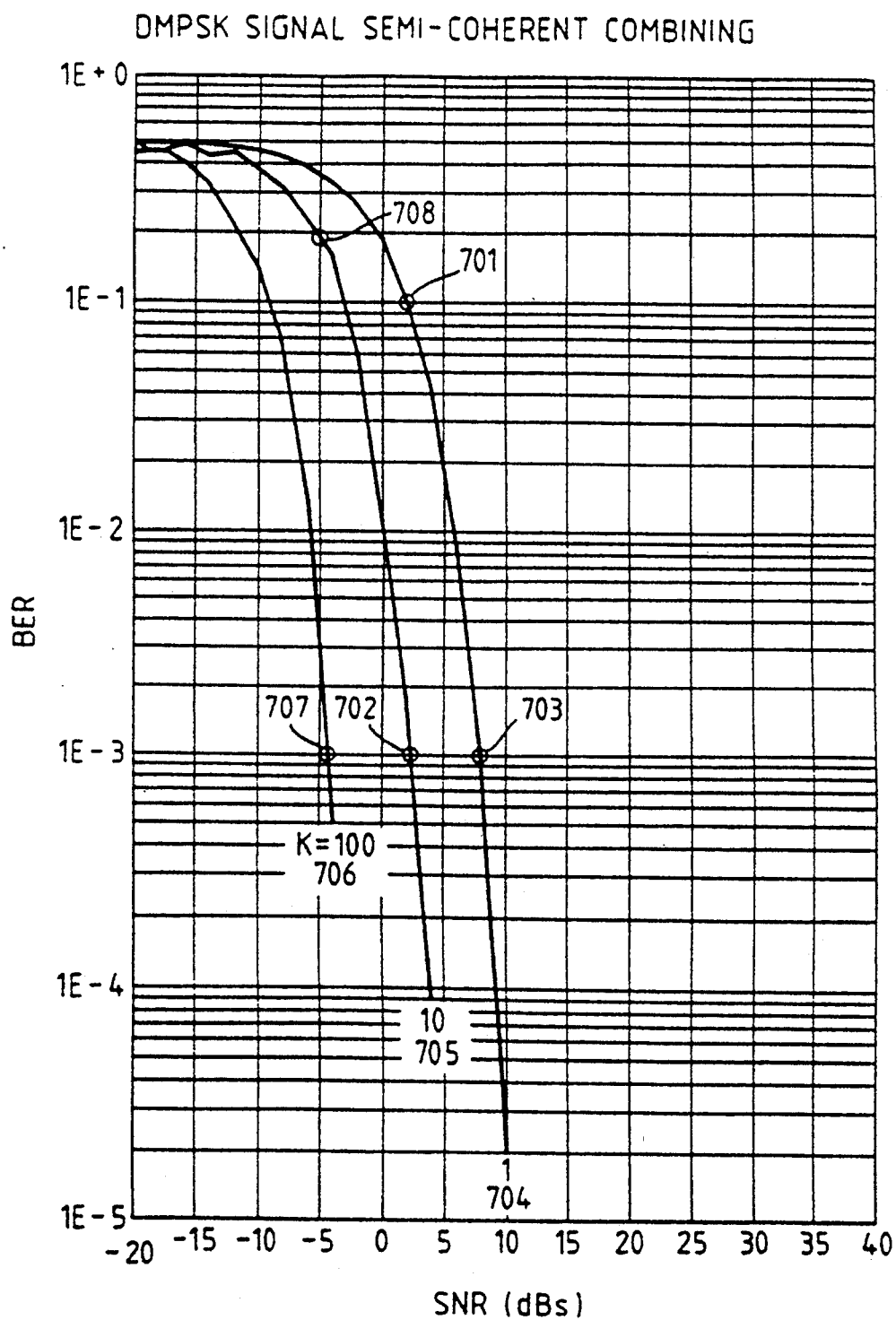

HIGH FREQUENCY MULTICHANNEL DIVERSITY DIFFERENTIAL PHASE SHIFT (DPSK) COMMUNICATIONS SYSTEM

BACKGROUND OF THE INVENTION

1. Field of the Invention

The invention relates to HF communications and in particular to a multichannel frequency diversity DPSK communications system for the HF radio band.

2. Discussion of Prior Art

The purpose of frequency diversity in a communications system is to overcome the vagaries of long range HF radio propagation and interference and thereby improve the ability to reliably detect the transmitted signal with greatly reduced errors and with increased availability.

If transmitted signals are sent using a plurality of different radio frequencies the intended receiver will be able to exploit the diversity reception to:
  a. reduce the received bit error rate
  b. avoid co-channel interference from other radio transmissions;
  c. overcome multipath time dispersion;
  d. overcome channel fading;
  e. reduce the effects of time/diurnal variations in propagation;
  f. exploit sporadic and transitory propagation;
  g. operate with lower transmitter powers:
  h. have improved performance (greater data rates); have increased availability (on-demand communications).

Diversity reception requires the provision of two or more (K) transmitted signals, each containing the same message (either simultaneously or time interleaved). On different radio frequency carriers having advantageously uncorrelated propagation characteristics: each carrier frequency defining a diversity channel.

At the receiver the diversity channels must be properly recombined in order to ideally produce an output signal which will have a much lower combined BER (bit error rate) than in any one received channel. In the simplest diversity combined the channel with the best S/N (signal-to-noise ratio) or lowest BER will be switched to the output. This type of switch 'combining' only works well, however, when at least one channel is always good. When the S/N is simultaneously poor in all the channels the output will be also be poor. A more advantageous method of diversity combining is to sum the received branches after weighting each channel. The channels can be weighted according to their S/N, for example; such systems are known as Maximal Ratio Combining. Using this technique it is possible to coherently combine the wanted signals (if channel co-phasing can be used) whilst at the same time only adding the noise in each channel incoherently. This produces a combined S/N which will be 10 Log(K)dBs better than any individual diversity channel, where the S/N is the same in each. However, to be most effective at HF, the channel frequencies must be separated by more than the correlation bandwidth (the range of frequencies over which noise signals are correlated). This will ensure each channel path will be totally uncorrelated in propagation characteristics such as, fading and multipath as well as interference. Unfortunately, this also means the phase characteristics for each path will also be very different from baud to baud. This uncorrelated phasing characteristic between channels will make it very difficult to properly co-phase the wanted signals from each path particularly since the S/N will normally be poor in each. At HF therefore, diversity combining can normally only be achieved using noncoherent signal combining.

SUMMARY OF THE INVENTION

The object of the present invention is to provide a multichannel diversity DPSK modulated communications system which overcomes the known HF propagation and interference problems and will optimally recombine DPSK modulated signals of poor S/N and with totally uncorrelated propagation characteristics.

The invention provides a high frequency multichannel communications system having:

a transmitter comprising:
  a) Input means to receive digital signal data for transmission;
  b) the input means connected to a plurality of separate diversity frequency channels distributed so as to produce a signal for transmission over a broad spectral region of the hf band, each channel including a differential phase shift key (DPSK) modulator whereby each channel is modulated at a low data rate; and
  c) means to combine the DPSK channel signals for transmission;

and a receiver comprising:
  a) receiver means to receive the transmitted signals and convert them to baseband;
  b) the receiver means being connected to a plurality of narrowband frequency channels, each channel including a DPSK detector responsive to a respective one of the transmitter diversity frequency signals;
  c) means to identify channels corrupted by noise; and
  d) semi-coherent processing means to vectorially combine the uncorrupted DPSK detector output signals in each baud period to determine the polarity of the transmitted data bit.

The data rate is preferably selected such that radio path time dispersion does not lead to intersymbol interference. Advantageously the transmission baud rate is between 20 and 100 per sec and is preferably 50 bps.

The modulation level (M) of the transmitted signal, i.e. the number of phase states, may be greater than two. The means to identify noise-corrupted channels is preferably a channel exciser which includes a phase window detector having M phase windows of width $<360/M$ deg centred on the expected phase directions. Advantageously there is included a counter which takes a running average for each channel, over a pre-determined number of baud periods, of the number of times the detected phase falls within one of the phase windows (HIT). A signal representing the proportion of HITs over the pre-determined number of baud periods for each channel is connected to a discriminator to determine whether the channel is noise corrupted. Noise corrupted channels are then excised. In one arrangement each phase window is $360/2M$ deg and the discrimination level (HITs to Misses) is set above 1. Preferably the discrimination level applied to the ratio of HITs to MISSes in each channel and the number of baud periods taken to measure the ratio are selected with reference to the resulting signal-to-noise (S/N) ratio and the required reliability of the channel excision.

Preferably each uncorrupted channel signal is added vectorially in the semi-coherent processor and the resultant vector for each baud period is connected to a PSK decoder to determine the data output signal.

In one advantageous arrangement the receiver can be arranged to bunch the uncorrupted frequency channels into groups where the bandwidth of a group is less than the correlation bandwidth, the channels of each bunch being connected to a respective coherent processor and the coherent processor outputs being connected to the semi-coherent processor. Preferably the bunch bandwidth is less than 2 kHz.

In a preferred arrangement a combined vector signal phase output from a semi-coherent processor may be connected to the channel excisers to determine channel excision. The detected phase signal in each channel is connected to one input of an error detector with the estimated combined vector signal phase being connected to a second input to the error detector, an output signal from the error detector is connected to a channel exciser whenever the detected error rate exceeds a pre-determined threshold. The detected phase signal is considered to be good if it falls within a pre-determined range from the combined vector phase signal. Advantageously the DPSK signal detected in each receiver channel is connected to first and second channel excisers and to the error detector; the output from the error detector being connected to both excisers to excise noise-corrupted channels; the first exciser being connected via a semi-coherent channel vector summer and a PSK detector to a data output and the second exciser being connected via a second semi-coherent vector summer to provide the estimated combined vector signal phase input signal to the second input of the error detector.

Erraneous channel 'capture' may be prevented by providing an excision decorrelator at the input to the second exciser used to provide the estimated group phase vector, the decorrelator being effective to prevent the number of excised channels from exceeding a pre-determined value.

In one arrangement the transmitter may include a demultiplexer whereby a high rate of input data to the demultiplexer is divided into groups of different frequency channels, each channel transmitting at a low data rate between 20–100 bps. In this arrangement the receiver includes a multiplexer to reproduce the higher data rate transmitted signal. Preferably the channels of any one multiplexed group are interleaved with the channel of every other group. By combining high modulation levels with the parallel demultiplexed data, even higher transmission rates can be achieved. In narrowband channels may be provided, spread over a 1 MHz bandwidth.

Preferably the data is differential phase shift key (DPSK) modulated in each channel. The receiver preferably includes an analogue to digital converter connected to a Fast Fourier Transform (FFT) processor which has a number of Frequency bins equal to the number of transmitted frequency channels. The signal phase is then detected in each frequency bin.

In the above arrangements the signal-to-noise of the received data signal may be improved by modulo-2 spreading the transmitted signal with a pseudorandom code (by a pseudo random number generator: PNG) and then despreading the signal in the receiver by means of a replica code. Advantageously the receiver is synchronised to the received signal by means of suitable timing signals. In the preferred arrangement data at 1 bps is spread using a PNG code of 50 bps and in the receiver the de-spread signal is summed over 1 sec or 50 received bits to determine the transmitted data bit polarities.

BRIEF DESCRIPTION OF THE DRAWINGS

The invention will now be described with reference to the accompanying Drawings of which:

FIG. 2 shows graphs of bit error rates (BE}R) against signal-to-noise ratios (SNR) for different modulation (M) levels;

FIG. 3 is a graph showing HF radio interference characteristics and FIG. 3b is an enlarged portion of FIG. 3a;

FIG. 5a shows an arrangement for converting a narrowband transmitted spectrum into parallel diversity channels and FIG. 5b in an audio baseband spectrum;

FIG. 7 shows graphs of BER against SNR using semi-coherent channel combining for a number of different diversity channels;

DETAILED DISCUSSION OF PREFERRED EMBODIMENTS

Figure 1A:
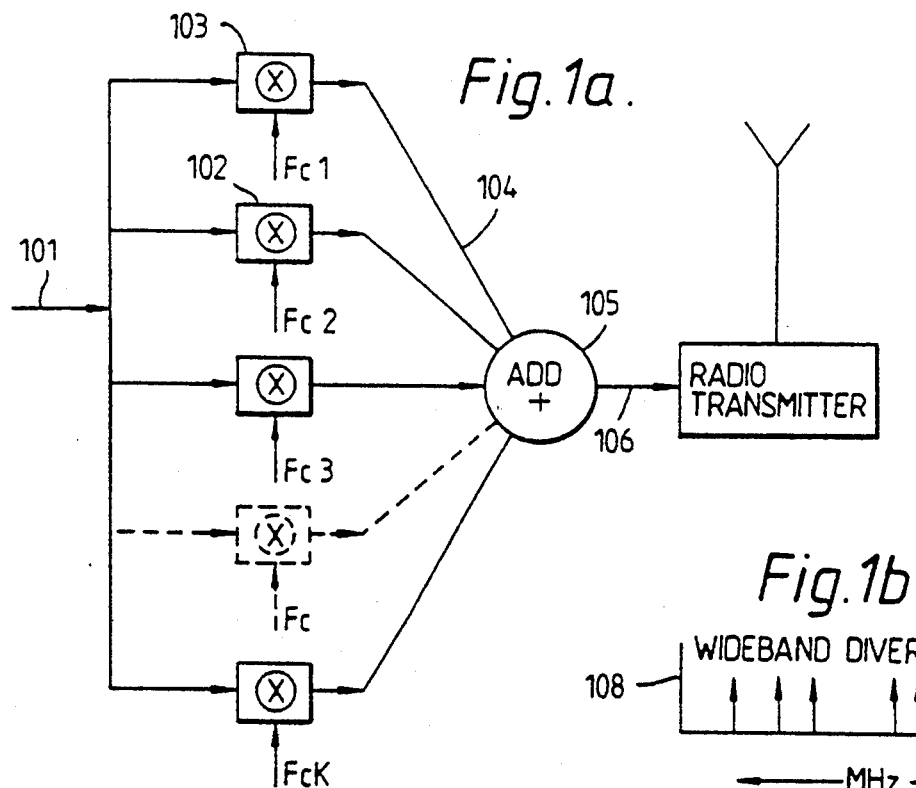
FIG. 1a is a schematic block diagram of a frequency diversity transmitter employing differential phase shift key (DPSK) modulation.
Figure 1B:
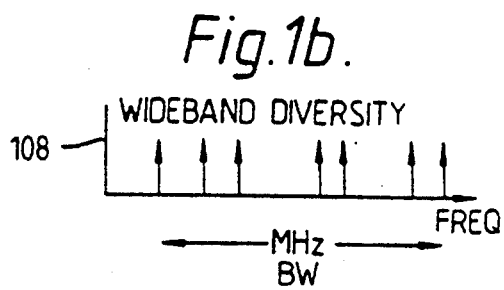
FIG. 1b illustrates wideband frequency diversity.
Figure 1C:
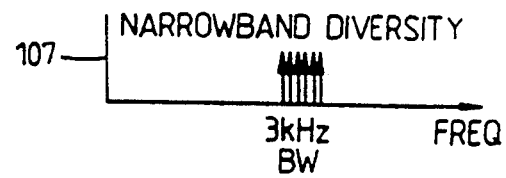
FIG. 1c illustrates narrowband frequency diversity.
Figure 1D:
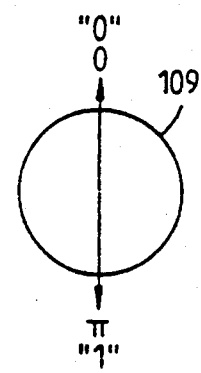
FIGS. 1d to 1f illustrate respectively BPSK (1 bit per symbol or modulation level M=2), QPSK (2 bits per symbol, M=4) and 8 PSK (3 bits per symbol, M=8)
Figure 1E:
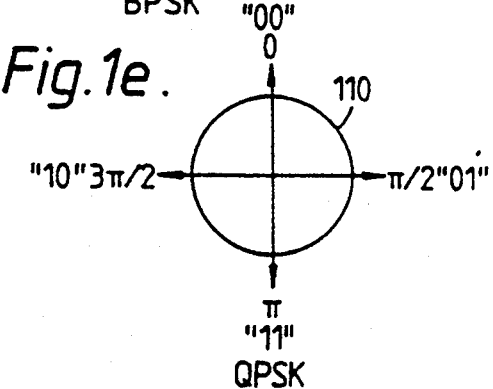
Figure 1F:
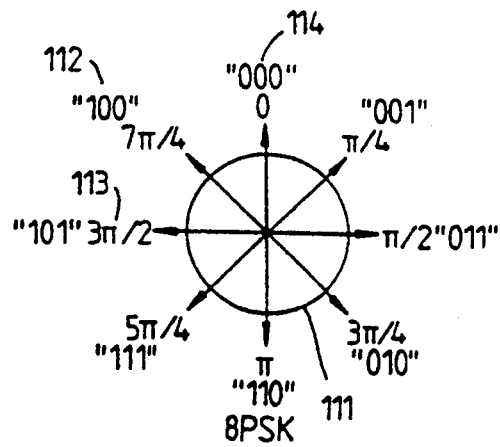

FIG. 1 shows how phase modulated transmitted carrier signals for the diversity system according to the present invention may be created. Input data 101 is used to modulate K different carrier diversity frequencies 102 using Differential Phase Shift Keying (DPSK) modulators 103. The outputs 104 from the K diversity modulators are summed in an adder 105 to produce the signal 106 for transmission via a radio transmitter and aerial. The K channel frequencies may be spaced over just a few kilohertz (107) or over several megahertz (108) of transmission spectrum, however the bandwidth of each channel is much narrower than the overall bandwidth.

Widely spaced diversity channels will provide protection against long term time/diurnal variations in propagation because the receiving algorithm is capable of selecting those frequencies which can propagate from those which cannot (as the MUF and LUF changes). This level of frequency diversity will therefore also provide a means for automatic frequency management of radio circuits as well as avoiding the normal interference and fading problems.

Narrowband (eg. 3 kHz) diversity will not have the same long term propagation advantages as wideband but it can still provide substantial protection against interference and multipath particularly if the transmitted signal has 10 or more diversity channels. The number of channels which can be deployed will depend on the symbol rate used to transmit the data and the total bandwidth allocated.

The symbol rate of the diversity channels, and therefore the message (101) data rate will also be limited by the prevailing HF propagation constants to a small definable range of possible values. The highest usable rate is controlled by the maximum radio path time dispersion, since it is necessary to have a minimum baud length which is always greater than this to overcome intersymbol interference. Typically this will be 10 milliseconds for most circuits so the highest rate must be less than 100 bauds/sec. The lowest symbol rate is controlled by the maximum doppler frequency shift observed over the radio paths and also the transmitted symbol phase modulation (M) level (ie. DBPSK or DQPSK and D8PSK etc.). For a doppler of 1 Hz and DBPSK modulation the minimum symbol rate must be greater than 20 bauds/sec. (For the embodiment of the invention now described, a symbol rate of 50 bauds/sec. has been chosen). For higher dopplers and phase modulation levels the symbol rate must be correspondingly increased but only to a maximum of 100 bauds. Higher modulation levels (M) are less tolerant to doppler and phase shifts because the data is coded onto the transmitted carrier at much closer phase states. For BPSK (109) the signal requires only two phase states (ie, 0 and pi) to transmit the data, whereas QPSK (110) needs 4 states (ie, 0, pi/2, pi, and, 3pi/2), and 8PSK requires 8 phases (ie, 0, pi/4, pi/2, 3pi/4, pi, 5pi/4, 3pi/2, and 7pi/4). For higher modulation levels therefore the received signal will be much more sensitive to frequency, phase or noise perturbations because a correspondingly smaller change in phase will be able to transmute the data from its correct value to an adjacent incorrect value. It is for these reasons the date values are arranged (prior art) to change by only one bit position between adjacent phase states, ie. binary "100" (112) and "101" (113) and "000" (114).

The effect of noise on the different phase modulation levels (M) is illustrated by FIG. 2. At 10 dBs S/N the BER for DBPSK (Mr2) is $1*10(-5)$ (201). For DQPSK (Mr4) it is $6*10(-3)$ (202). For D8PSK (Mr8) it is $9*10(2)$ (203) and for D16PSK (M=16) it will be $1.5*10(-1)$ (204).

Higher modulation levels would normally therefore be avoided for HF communications since they require significant increases in signal power to effect the same BER as. for example, DBPSK. For example for a BER of 10(3) to be achieved using DBPSK a S/N of 7.5 dBs (205) is needed whereas it requires 23 dBs for D16PSK (206).

Figure 3B:
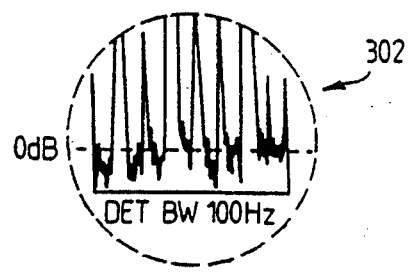
Figure 3A:
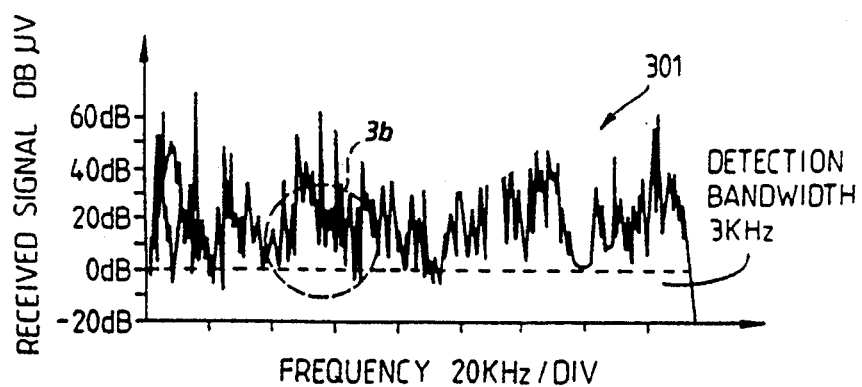
Figure 4:
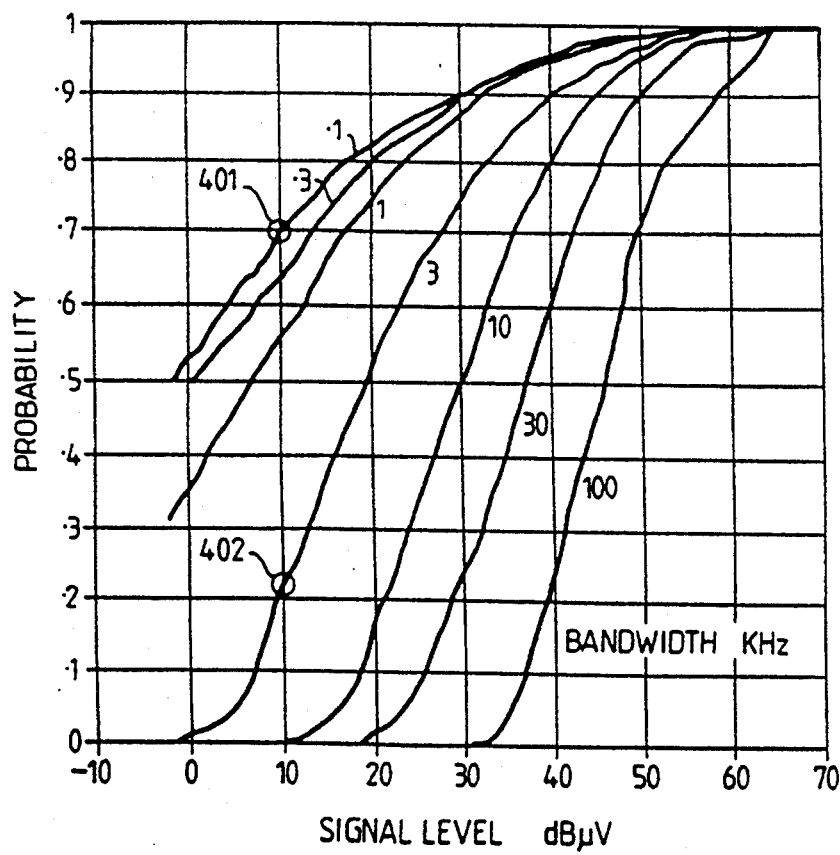
FIG. 4 is a graph showing the signal level probability function as a function of receiver bandwidth.

The symbol rate of the transmitted signal is also very important because it defines the detection bandwidth required in each diversity channel of the receiver. Lower data rates need less bandwidth and are therefore less likely to be corrupted by interference. FIG. 3a shows the typical interference spectrum for the HF radio band. Wideband detection (301) introduces much higher levels of received noise floor than that for narrowband (302) shown in FIG. 3b. This effect occurs because nearly all the signals transmitted in the HF band are narrowband, is produces gaps in the received spectrum if the receiver bandwidth is also very small (say 100 Hz). FIG. 4 illustrates this more clearly as a Cumulative Probability Density Function (CPDF) plot for HF interference in received bandwidths of 100 Hz to 100 kHz. It can be shown, for example, that she probability of falling on any random 100 Hz channel with less than 10 dBm volts. is 70% (401) whereas the probability for a 3 kHz channel will be only 23% (402). A symbol rate of 50 bauds/sec will therefore provide good interference selectivity because the detection bandwidth can be less than 100 Hz.

FIG. 5 is one arrangement for converting a narrowband (107, FIG. 1) transmitted RF spectrum into K parallel diversity channels. A receiver antenna 501 is connected to a radio receiver 502 which converts the frequency of the transmitted signal down to an audio baseband spectrum (503) shown in FIG. 5b. For this example the signal is assumed to be sent as a single sideband (USB) format in a 3 kHz bandwidth but the principles remain the same if a wideband RF transmission (108. FIG. 1) is used. The receiver output 504 is synchronously detected in respective product detectors 505 using reference sub-carrier signals 506. The detector outputs are then filtered to the necessary bandwidth (<50 Hz) by lowpass filters 507 to exclude any out-of-band interference or noise (not shown). The K diversity channel signals are then processed by a DPSK Diversity Demodulator and Combined 508 to produce the enhanced data output 509.

Figure 6A:
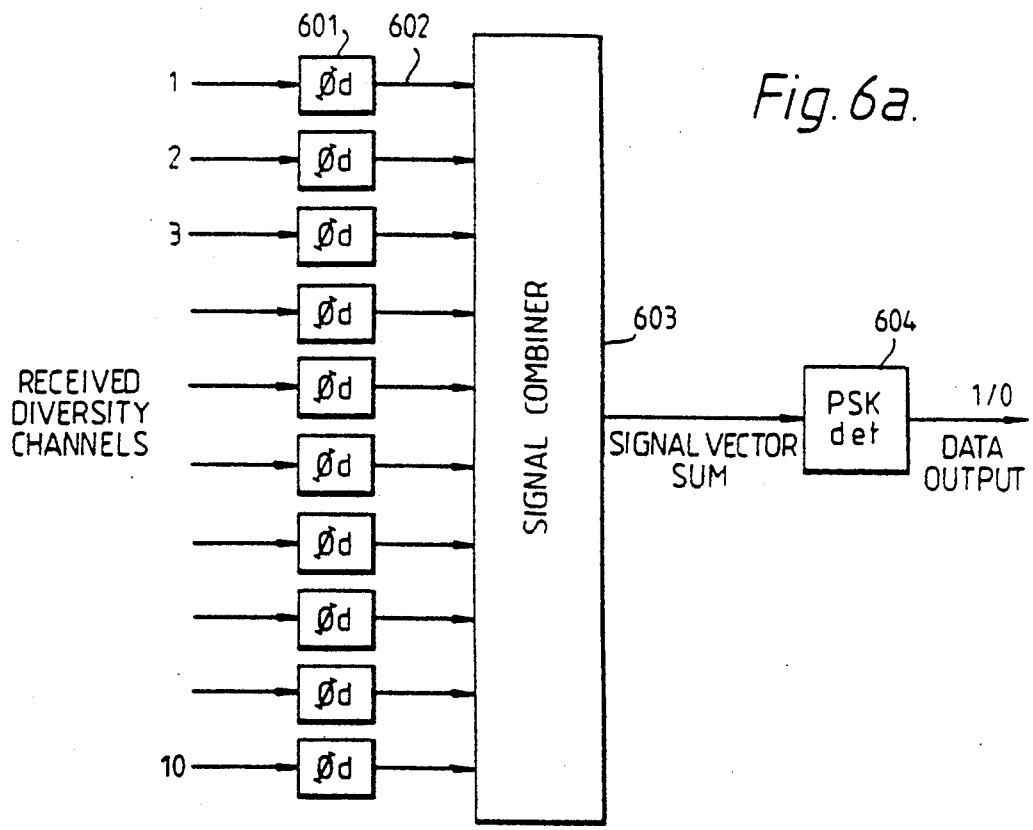
FIG. 6a is a block diagram illustrating the vector addition of detected signal phases in parallel diversity channels in a semi-coherent processor.
Figure 6B:
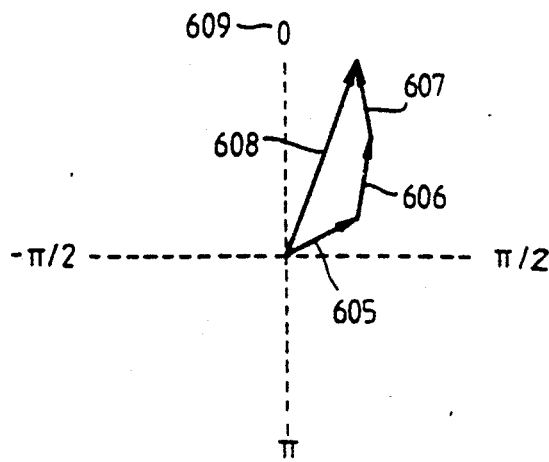
FIG. 6b graphically illustrates the vector addition.
Figure 6C:
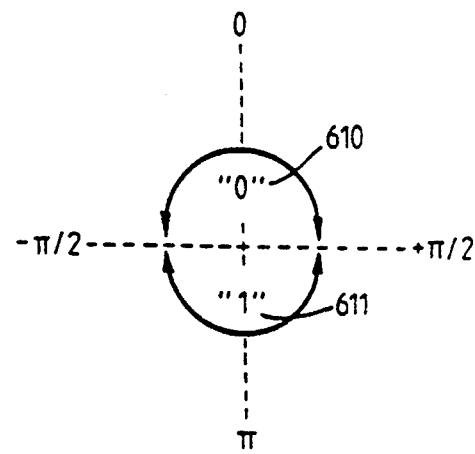
FIG. 6c illustrates the data bit decision process.
Figure 6D:
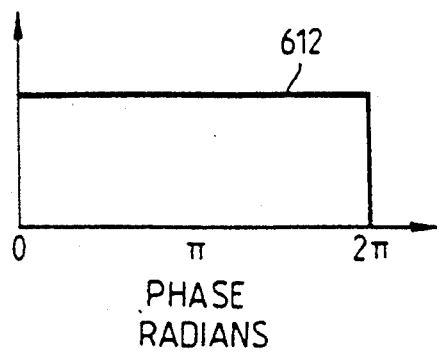
FIG. 6d is the theoretical probability density function (PDF) for random noise phase shifts at the receiver input.
Figure 6E:
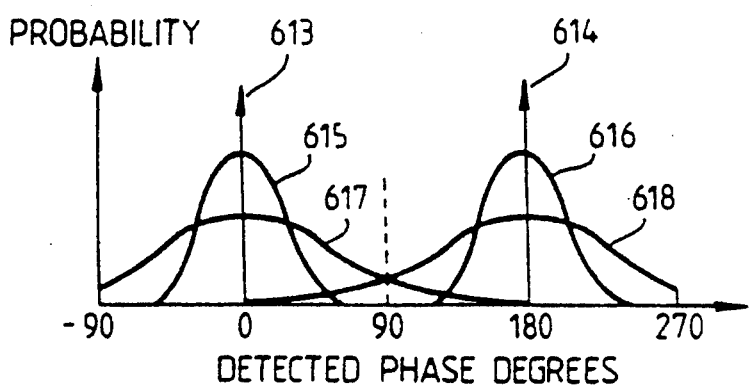
FIG. 6e illustrates the PDFs for BPSK signals for two different signal-to-noise ratios.
Figure 6F:
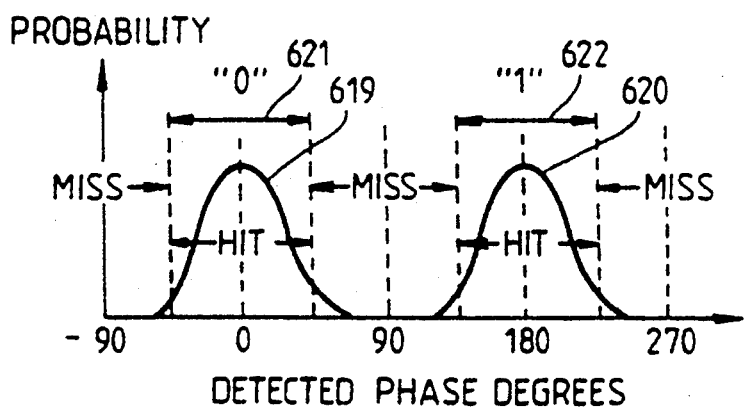
FIG. 6f shows the superimposition of phase windows on the BPSK PDF to determine a measure of channel interference.

FIG. 6a shows the proposed semi-coherent channel signal addition process to be used in the diversity combinet 508. Differential Phase Detection 601 is done over each baud period (20 ms) in each of the 10 frequency channels. The frequency diversity channels, which should all have identical phase, are then vectorially added 603 and a decision algorithm PSK decoder 604 is employed to determine the transmitted data bit polarities. FIG. 6b illustrates the vector (unity normalised) addition of three such differential phase detector outputs 605, 606, 607 with vector 608 representing the vector sum. Ideally for perfect S/N all these vectors should be in line with "O" (609) but noise and interference varies the detected phase differently in each diversity channel. In a DBPSK modulation system, where the phase difference should be either 0 or pi, as indicated in FIG. 6c, the decision algorithm 604 can be arranged such that the data bit is resolved as "O" (610) if the vector sum 608 falls within the range of angles $0 +/- pi/2$ and will be a "1" (611) if it falls within pi $+/- pi/2$. Where higher order PSK modulation is used , DQPSK for example, the decision window (0 +/−pi/2 above) is made appropriately smaller about the expected phase change within a baud period.

Where 2-phase DPSK is employed we expect the DPSK detector output to be 0 or pi degs (109, FIG. 1) at the baud rate of 50/sec. Thus the DPSK output is sampled 50 times a second. If interference is present this does not have exactly the same frequency or expected phase as any one good signal channel and will cause the measured signal to phase rotate in that channel. If there were just random noise phase shifts at the DPSK input this would lead to a uniform phase Probability Density Function (PDF) 612 (FIG. 6d) at the DPSK detector output (602). For the 2-phase DPSK system we can define the detection windows for a data "0" as 0 deg +/−90 degs and "1" as 180 deg +/−90 deg because the phase PDF distribution is centred on 0 deg and 180 deg although the detected phase can be deviated away from the true position by random noise as shown in FIG. 6e. For S/N=infinity the received phase will be either 0 deg or 180 deg (613,614). For lower S/N ratios the phase will increasingly (for falling S/N) have a probability of being further way from 0 and 180 degs. A good S/N PDF is shown by 615,616 and a poor S/N PDF by 617, 618. For detection therefore a signal phase which lies within +/−90 degs of the phase positions 0 and 180 degs will be detected as 0 and 180 degs respectively (i.e. "0" or "1"). FIG. 6e suggests a method for directly measuring signal quantity and its potential for use in an interference excision algorithm without any prior knowledge of the data being transmitted. FIG. 6f shows the PDF of phase for a DBPSK signal of modest S/N ratio. It can be seen that the phase has a higher probability of being within a small range of (either) 0 deg or 180 degs. If the received signal was just random noise/interference this would not be true, as indicated by FIG. 6d.

For noise or interference discrimination, therefore, we reduce the phase windows (621, 622), about the expected phase directions by say half, to +/45 degs. A running average is then taken for each channel, over a number of baud periods of how many times the detected phase falls within the expected windows 621,622 (Hit) and the number of times it falls outside (Miss) the expected windows, as indicated in FIG. 6f. If the ratio of Hits to Misses is much greater than 1 then the channel may be considered good. For lower S/N this Phase PDF ratio will be much lower but >1. For random noise, for example, it will be an average 1 because there is an equal probability of being a Hit or a Miss (from 612).

Figure 6G:
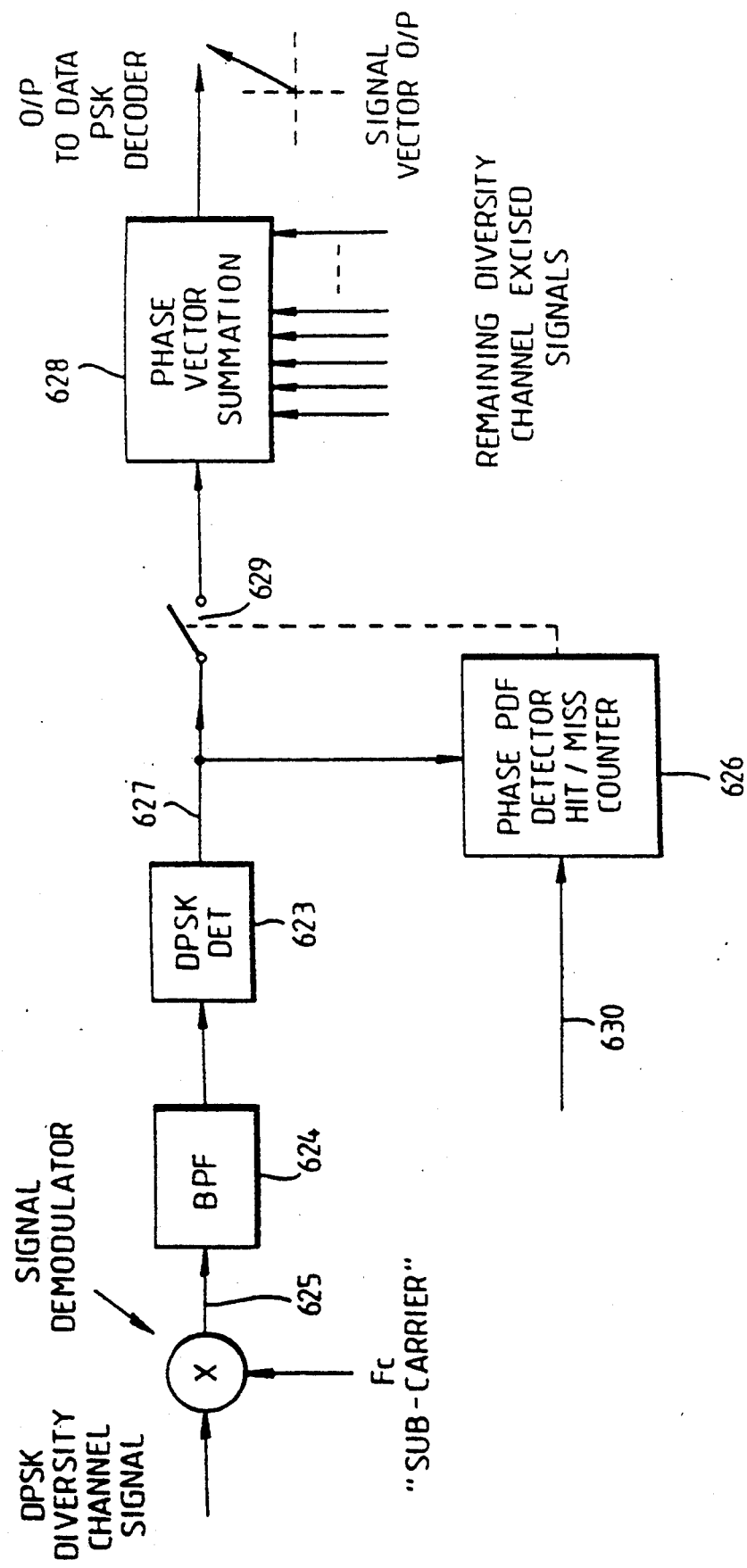
FIG. 6g illustrates implementation of the FIG. 6f scheme for channel excision prior to semi-coherent phase vector summation.

FIG. 6g shows how the Phase DPSK decoder 623 is connected via an input noise filter 624 to a detected receiver channel input 625 to operate in conjunction with a PDF detector 626 and as an interference/noise channel exciser system. A Hit/miss count in the exciser 626, as described with reference to FIG. 6f, would be made at the detector output 627 and if this exceeds a specified (S/N) threshold 630 the detected signal in the receiver channel 627 will be connected to a subsequent phase vector summing circuit 628, as described above, by the switch 629. The setting of the S/N threshold in the exciser 626 is critical to the proper optimum operation of the system because this decides what the quality of the channel signal shall be before it is added to the phase vector summing circuit 628. If, For example, the number of channels being added is very large, say 100, then it is necessary to include all those channels having a S/N of >−4.5 dBs (a BEB of 3.5*10(−1), FIG. 2. 207) because when added together they can produce a resulting equivalent signal of >+7 dBs (ie. a BER of 1*10(3), see FIG. 7,707). When the number of channels is much smaller. say 10, then only channels of >*2 dBs (BER of 1*10(−1), 701) can be used to produce a resulting equivalent signal of >*7 dBs (BER of 1*10(−3), 703) because the combined output from the 10 diversity channels will be 1*10(−3) BER, 702 at 2 dBs S/N.

The time taken (the number of baud periods) to measure the Hit to Miss ratio will depend on the acceptable S/N ratios for the signals and the required reliability of excision process. In general the poorer the signal-to-noise ratio, then the longer it will take to measure the phase PDF ratio. For small numbers of diversity channel vector combining the S/N ratio has to be good (ie.>2 dBs for 10 channels) so the number of bauds needed for calculating the Phase PDF can be quite small. Typically this may be done over a 20 baud period (0.4 sec.). If we count 20 Hits (very low noise probability) then the switch 629 in the excision circuit (FIG. 6g) is closed while if the number is 10 (random noise) then the switch 629 is opened. A threshold fop channel acceptance is therefore set between 10 and 20 Hits in this example. Using the binomial theory, the probability of 20 Hits being due just to noise is 1 in 106 so the probability of a false channel excision control is very small. The probability or exceeding a specified threshold number or Hits due to noise can be reduced by counting over a larger number of baud samples.

The inventor has shown that even though there may be a poor demodulation signal in the individual channels (with a poor estimate of phase change), when the vector sum is done followed by PSK detection there is a significant processing gain.

The effect of channel addition can be seen more clearly with reference to FIG. 7. This shows graphs 704 to 706 of the required channel signal-to-noise (dBs) against bit error rate (BER) for the addition of 1, 10, and 100 channels respectively for DBPSK (M-ary=2). Surprisingly this shows a significant improvement in using more than one channel despite the fact that DBPSK demodulation is used prior to channel addition (See FIG. 6a).

Experiment has shown that there are normally correlation bandwidths of greater than a few kilohertz in the HF spectrum. This is the extent of the frequency band over which the transmission dispersion characteristics are correlated and the phases of the received signals are sensibly the same. To take advantage of this property the transmission of some of the diversity channels may be arranged such that: some of the channels are bunched in frequency bands of about 1 or 2 kHz across the occupied frequency spectrum. True correlation techniques can then be applied to each of the channels in a bunch. Thus for example, each bunch might comprise 10 channels. True coherent processing would be used for each bunch of 10 channels (a maximum of 10 dBs of processing gain) and then semi-coherent processing will be applied to the bunches (as done in FIG. 6a) to re-combine all the remaining (bunched) frequency diversity channels. This approach will give greater processing gain and allow even lower SNR reception and therefore will lead to improved communications performance and reliability in the presence of background noise.

Figure 8:
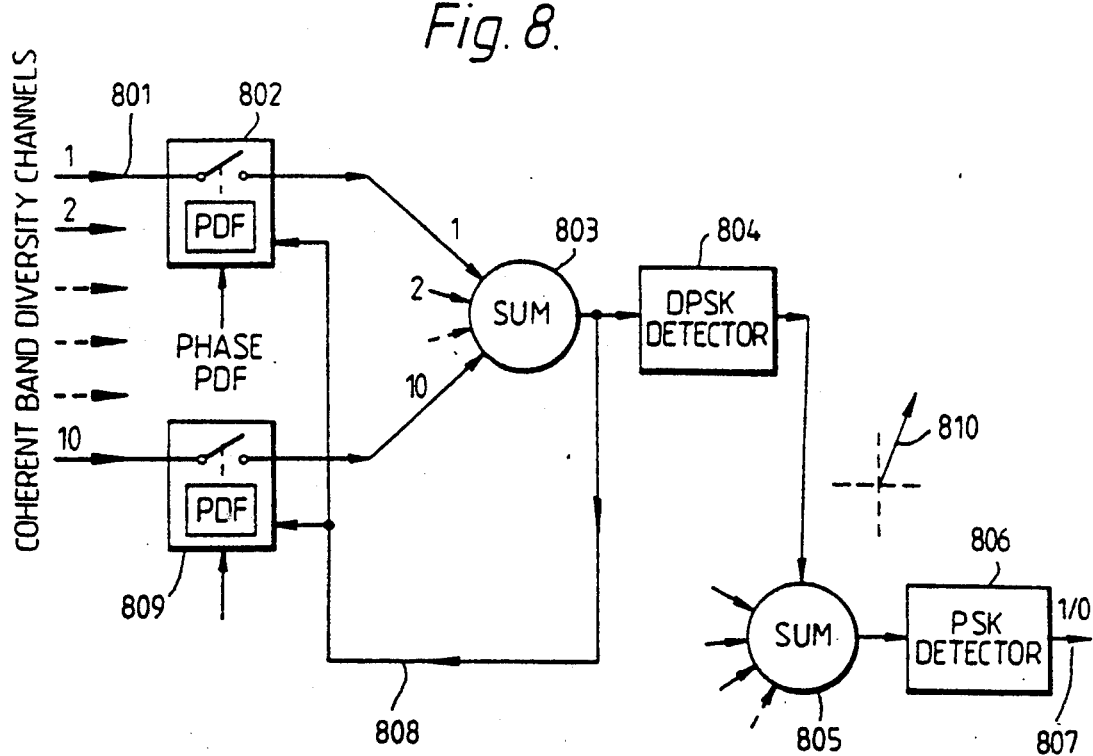
FIG. 8 is a block diagram of a receiver circuit including coherent processing of channels within bunches in addition to semi-coherent processing of the channel bunches.

FIG. 8 shows this process more clearly and shows how interference excision would be implemented. The input channels 801 in the bunch correlation bandwidth are first separately excised (802) before being coherently summed (ie. before DPSK detection) in 803, to form the 'bunch channel' sum signal. If more channel bunches are used to form the complete diversity group (which may be widely spaced in frequency), then these are semi-coherently added together in 805 after the signals from 803 are differentially phase demodulated in 804. The vector sum 810 output from 805 is decoded in the PSK phase detector 806 to produce the data output 807 for the group to form the user data signal. Since the signals in the 'bunch' diversity channels should have the same phase characteristics (being contained within a correlated bandwidth) the signal at the output of the coherent summer 803 must have the same signal phase as in any of the diversity channels, but with a greatly enhanced S/N. In gaussian noise this improvement is 10 log(N) where N is the number of channels in the 'bunch'. The combined sum vector signal phase 808 from the summer 803 is therefore a more accurate measure of the actual phase of every channel signal. This can therefore be used to increase the accuracy of the excision modules (802) phase PDF Hit/Miss ratio counter (809) because we now know what the phase of each channel signal should actually be. This increased accuracy will significantly reduce the probability of a false phase PDF count and also reduce the time taken to make a channel excision decision. The performance of a 100 channel group system (say) based on FIG. 8 would yield a much greater processing gain than the previously described semicoherent system (FIGS. 5 and 6). FIG. 7 shows, for example, that the semi-coherent system would give a gain of about 12 dBs for $1*10(-3)$ BER (707 from 703=12 dBs). For a system like FIG. 8 where there could be 10 channels/bunch and 10 bunches/group the gain would be about 16 dBs (10+6 dBs) ie. 10 Log(10)−702 from 703.

Figure 10:
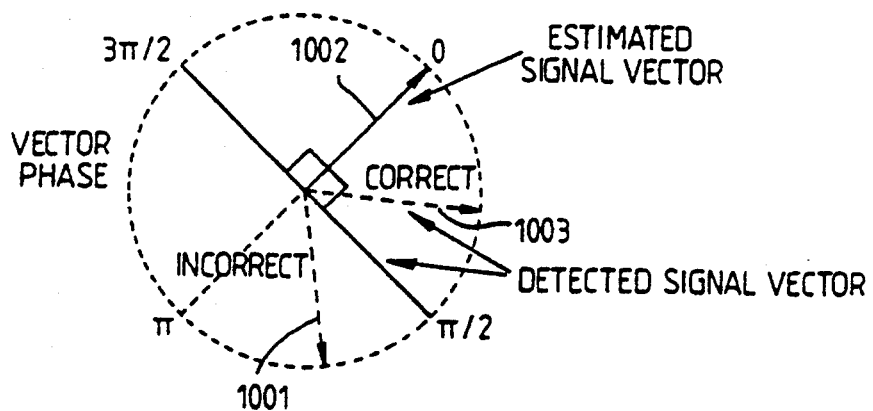
FIG. 10 is a phase diagram illustrating operation of the error detector in the FIG. 9 arrangement.
Figure 9:
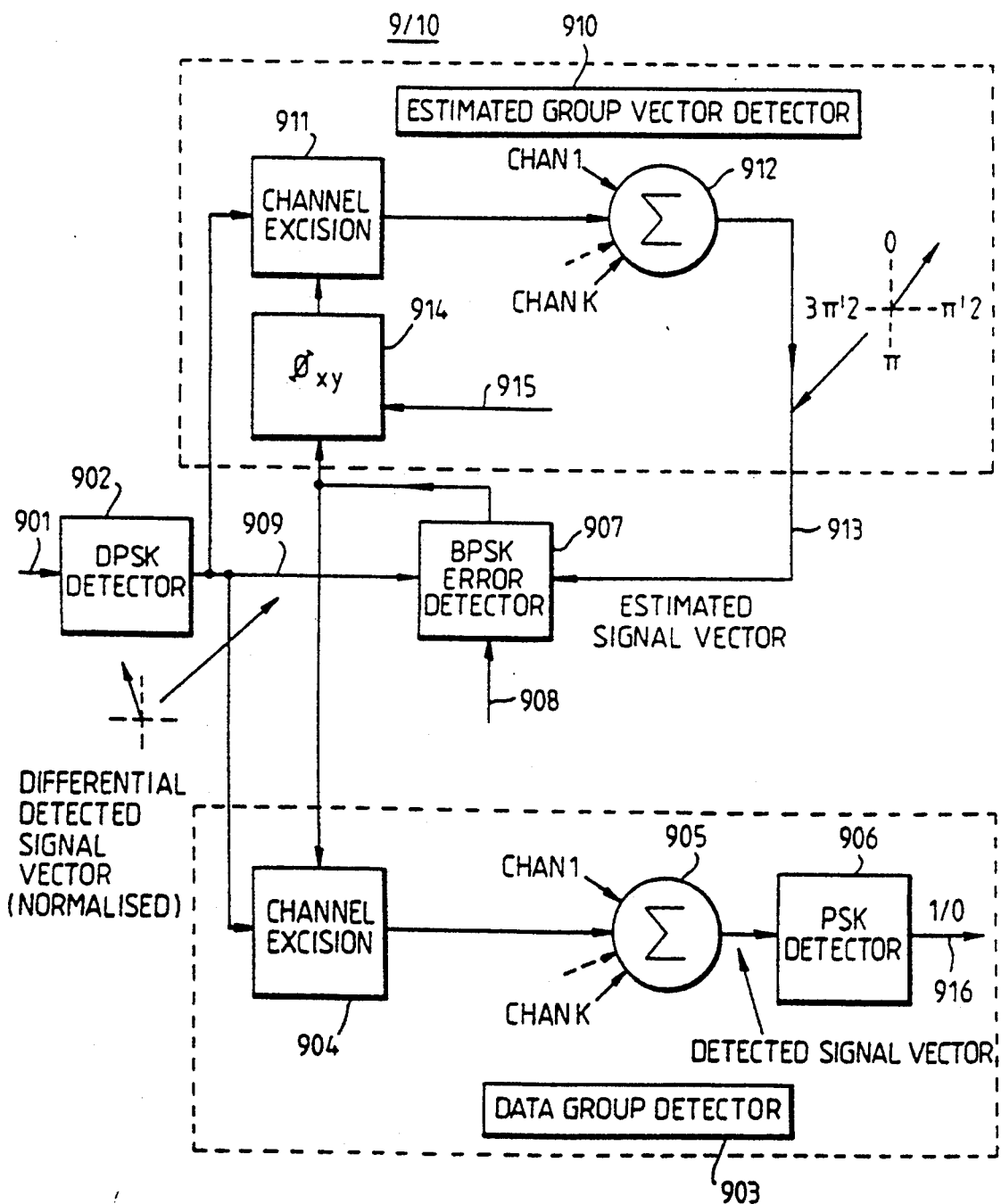
FIG. 9 is an alternative to the FIG. 6g arrangement in which received phase vectors are compared to estimated phase vectors and the error rate in this comparison is used to determine channel excision.

The alternative arrangement, discussed above, for the channel excision circuit previously suEgested in FIG. 6e has been found to improve the phase PDF detector and the channel excision process in general. FIG. 9 shows the improved arrangement for one of many channels (K). The received channel input 901 is differentially detected by a phase detector 902 to find the change in relative phase of the signal since the last baud. The data output 916 from the circuit is determined using a Data Group Detector 903 composed of a data channel exciser 904, a vector summer 905 and an MPSK decoder 906. In this arrangement the MPSK decoder 906 converts the phase of the vector summer 905 output to a binary code (gray) as is known in the art. Each channel input to the vector summer 905 is excised if the channel quality falls below a predefined threshold. In this particular channel the exciser 904 will be activated if the count of a BPSK error detector 907 exceeds a set threshold 908 in a given period of time (or baud count). The BPSK error detector 907 thus replaces the phase PDF detector 626. FIG. 6g. in the previous arrangements. The purpose of the BPSK error detector 907 is to compare the phase of the channel signal 909 with that produced by an Estimated Group Vector Detector 910 composed of a channel exciser 911 and a vector summer 912. The vector summer 912 produces the estimated signal vector 913 from the combined inputs of the unexcised channels in the diversity group (as is also done in the data group detector 903). The estimated signal vector 913 therefore represents the sum of all the good channels in the diversity group and will therefore have a better signal to noise ratio (S/N) than any one individual channel in the group. In the BPSK error detector 907 the phase of the channel signal 909 is compared to the phase of the estimated group vector 913 as shown in FIG. 10. The BPSK error detector 907 will count an error whenever the phase of the channel signal 1001 exceeds the estimated signal vector 1002 phase by more than $+/-pi/2$. The signal 1003 is considered correct if it lies within $+/-pi/2$ of the estimated signal vector 1002.

This alternative system is better than the previous Hit/Miss phase PDF arrangement because a direct comparison is now made between each measured channel phase and what it should actually have been. In the previous arrangement a test was made (FIG. 6f) to see if the signal phase "fitted" the expected phase (PDF) for the given modulation level.

In the FIG. 9 arrangement the BPSK error count is always made as shown in FIG. 10. irrespective of the modulation level used to transmit the data (eg. D8PSK). whereas in the previous arrangement the phase PDF Hit and Miss windows have to be changed to suit the modulation level being used.

A refinement to the channel excision process is also necessary (in the estimated group vector detector 910) to prevent erroneous channel 'capture'. This is done by using a channel decorrelator 914. The decorrelator 914 is used to prevent a small number of channels "capturing" the excision process and locking out all the other channels. The decorrelator 914 operates to stop the number of unexcised channels falling below a defined ratio 915, for example 50%. The decorrelator 914 unexcises some of the poor channels to the summer 912 to prevent capture. Adding these poor channels back to the summing process produces a negligible effect on the data output bit error rate.

Throughout the specification the bandwidth of the individual channels is described as narrowband since it is much smaller than the occupied bandwidth of the overall system. In addition, the rate of data transmission, typically 50 bps per channel, is selected to be low enough such that a signal period is longer than a typical multipath impulse response (about 10 ms). The plurality of channels enable the system to achieve a significant signal processing gain in order to operate the system specifically in much higher ambient background interference and noise levels than the individual channel signals themselves.

Figure 11:
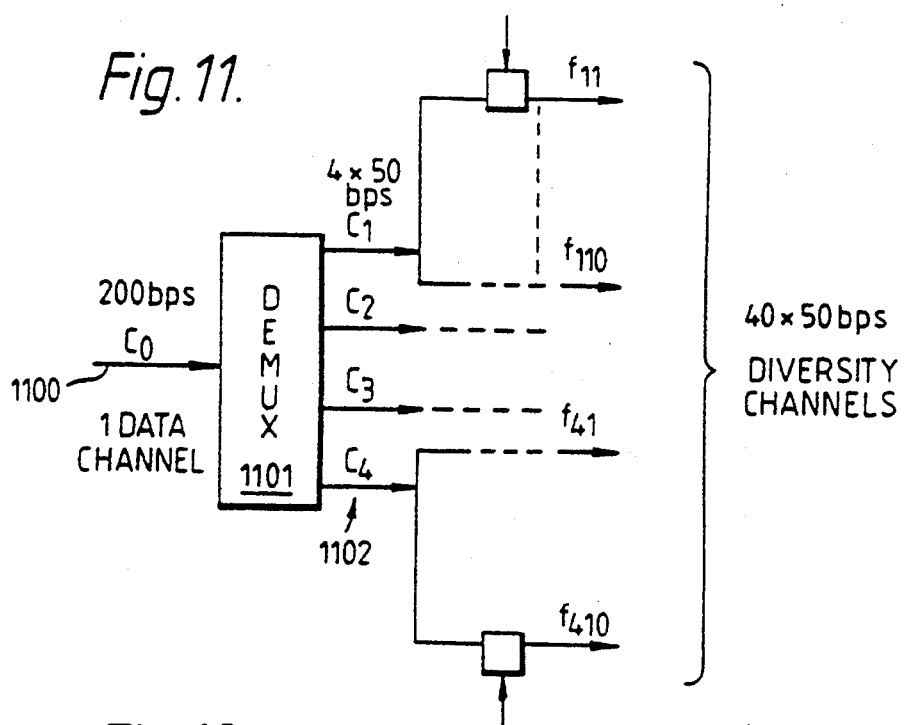
FIG. 11 is a block diagram of a demultiplexed transmitter enabling high rates of data transmission by means of 50 bps channels.

The diversity channels can also be divided into groups and a demultiplexer provided in the transmitter, connecting the input means to each group whereby a higher data rate input signal can be demultiplexed to produce a multiplicity of parallel lower data rate channels in each diversity group, and in the receiver the means to recombine the channels includes a multiplexer to reproduce the higher data rate transmitted signal. FIG. 11 shows one such example. Data at 200 bps for transmission is connected to the input 1100 ($C_0$) of a demultiplexer 1101, providing four data output channels 1102 ($C_1$-$C_4$) each carrying 50 bps. Each output channel 1102 is connected to 10 frequency modulators to provide 10 diversity channels ($f_{11}$... $f_{110}$; ... ($f_{41}$... $f_{410}$; the frequencies corresponding to each of the channels $C_m$ being interleaved with frequencies from each of the other channels. Thus the order of frequencies may be, for example, $f_{11}$, $f_{21}$, $f_{31}$, $f_{41}$, $f_{21}$, $f_{22}$, $f_{23}$, $f_{42}$... etc. In the receiver the signals detected in the four paralleled 50 bps channels are connected to a multiplexer to reconstitute the 200 bps data output. By this means transmission data rates of 200 bps, and higher, can be achieved while preserving multipath discrimination, interference rejection and anti-fading characteristics. Higher data rates may be also be more easily realised if higher phase modulation levels (M) are also used in combination with channel multiplexity.

The channels of any one multiplexed group are preferably interleaved with the channel of every other group such that the channels of each particular group are spread throughout a broader transmission bandwidth. The number of sub-channels used is optional, but in the limit this depends on the total number of diversity channels available and the required data rate. In general, the more sub-channels used the greater will be the data rate and/or the higher will be the signal processing gain. Thus generally the highest possible bandwidth should be used to achieve the highest processing gain. This in turn will allow the system to be operated at the lowest signal to noise or interference ratio.

In one possible arrangement having relatively few diversity channels the communications system has say 10 narrowband channels spread over a 1 MHz bandwidth. In this arrangement interference corrupted, or poorly propagating, channels are excised in the receiver before the channels are recombined. By this means the despreading/diversity combining and detection mechanisms in the receiver are optimised and processing gains are produced to enable weak transmitted signals to be recovered from an otherwise poor radio circuit condition.

Thus by using a number of diversity channel frequencies to transmit each data bit it is possible to recover the transmitted message from a very noisy received signal spectrum. Those channels with inacceptably high noise or interference can be removed without producing serious degradation because each data bit is transmitted using so many channels and it only requires one or more good S/N channels to receive a data bit correctly. in the above arrangements the data is differential phase shift key (DPSK) modulated in each diversity channel. In addition, where differential phase shift key (DPSK) modulation is employed, this has been shown to be operable from M-ary number 2 to at least 16 (where M is the modulation level used). In the semi-coherent phase processing described in the above arrangements the difference phases relevant to an element of data, in all channels in a group, are added vectorially and the resultant vector is used to determine the data element. Thus the combined signal is assumed to be the same as the wanted signal. On the face of it this would appear to be an incorrect assumption since it is derived from all channels and the preponderance of these may be noisy. However, computer simulations and experiments have shown that this arrangement works very well and the combined output from all the channels is a good representation of the wanted signal.

The phase of this signal can therefore be used to measure more accurately the phase PDF (FIGS. 6d-f) in each channel. This is done by counting the number of times the channel signal phase falls within defined limits of the combined signal phase (Hits). Channels which fail to achieve a desired Hit count are then excised from the combined signal and this in turn improves the accuracy of the combined signal phase. This results in a rapidly converging excision system. By including in each channel an error detector and an exciser where the resultant phase vectors for each signal are connected to the error detector where they are compared to the corresponding measured phases in the diversity channels, an output signal is produced therein corresponding to the proportion of channel phases which lie within pre-determined phase limits of the resultant phase vectors. Throughput signal is then connected to the exciser where the channel is accepted or excised for data decoding in dependence on whether the measured proportion exceeds a further predetermined limit.

The error detector output may also be used to control a channel exciser at the input to the phase vector adder whereby only good channel signals determine the resultant phase vectors. In this arrangement the output from the error detector is connected to a decorrelator which compares the proportion of channels for excision to a predetermined limit and prevents channel excision numbers exceeding the limit.

The receiver may include an analogue to digital converter connected to a fast Fourier transform (FFT) processor which has a number of frequency bins equal to the number of transmitted frequency channels. The interference excision means then includes means to measure the signal phase in each frequency bin and to determine the quality of each received frequency diversity channel, and to excise channels where interference is subsequently detected. Each channel is measured for quality by comparing its phase with the expected values and a count is made of the number of times it looks like the expected phase (a Hit). If this count exceeds a fixed threshold level then the channel is used. If the channel count is less than the threshold then the channel output is excised before it can be added in a vector summer.

Figure 12:
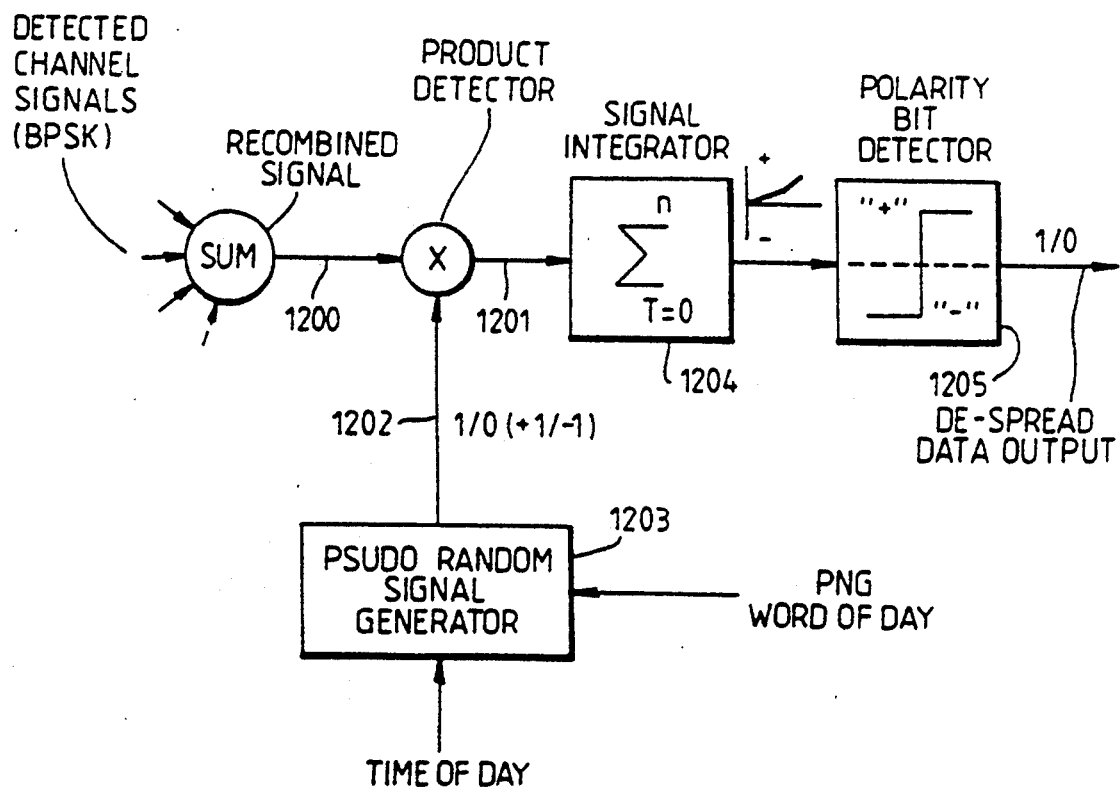
FIG. 12 is a modification of the communications system employing spread spectrum data transmission and coherent receiver signal processing.

A further refinement for overcoming noise is shown in FIG. 12. A means is shown whereby the Vector Sum (905 or 805 or 617 or 603) output, of the data signal, may be enhanced in S/N by integrating (summing) the signal over several bauds (10 on 100 data bits, for example). In this means a lower user data rate, of said 1 bps, may be transmitted using a 50 bps DBPSK signal by Modulo 2 multiplying (spreading) the lower user data rate with a pseudo-random code (of 50 bps).

At the receiver the data modulated 50 bps code is re-multiplied (de-spread) by a replica code of the same sequence, reproduced in the receiver. (being previously synchronised using Time Of Day and Word Day). The de-spread signal is then summed over 1 second or 50 bits (50 bps/1 bps = 1 sec.) to determine the transmitted data bit polarities.

In FIG. 12 the summed (prior to PSK decoding) diversity channels 1200. of 50 bps. is multiplied (1201) by the Pseudo Random Code 1202. of 50 bps, produced by the code generator 1203. Generator 1203 is designed to reproduce the same coded sequence used to spread the data in the transmitter. An integrator 1204 sums the code products from 1201 over the user data rate period and a polarity bit detector 1205 determines the bit polarity at the end of the integration time (1 sec.). The signal processing gain achieved by the mechanism shown in FIG. 12 will be 10 Log(n), where n is the number of coded bits used to transmit each data bit. By this means the user data when transmitted over the diversity channels will be much less sensitive to interference and noise and the BER achieved will be greatly reduced. For example, in FIG. 7 the BER for 10 DBPSK diversity channels at −5 dBs S/N will be about 20%. 708. If a 10 bit (n=10) signal integration 1204 is used (5bps user data rate) the processing gain will be 10 dBs and the error rate will fall to less than $1*10(-4)$.

I claim:

1. A high frequency multichannel communications system having at least a transmitter and a receiver:
   said transmitter comprising:
   a) input means for receiving digital signal data for transmission of transmitted data bits:
   b) the input means, connected to a plurality of separate diversity frequency channels distributed over a broad spectral region of a high frequency band, each channel including a differential phase shift key (DPSK) modulator, for modulating a channel frequency by successive bits of the digital signal data at a low data rate to produce a DPSK channel signal; and
   c) means for combining the DPSK channel signals from each of the plurality of separate diversity frequency channels for transmission; and
   wherein said receiver comprising:
   a) receiver means for receiving and demodulating the transmitted signals to form baseband signals;
   b) said baseband signals from the receiver means being connected to a plurality of narrowband receiver frequency channels, each receiver frequency channel including a DPSK detector responsive to a respective one of the transmitted DPSK channel frequency signals;
   c) means for identifying any of said receiver frequency channels corrupted by noise; and
   d) semi-coherent processing means, responsive to each transmitted data bit, for vectorially adding DPSK detector output signals, excluding said channels corrupted by noise and for producing a resultant vector signal phase for determining polarity of each transmitted data bit as a data output signal.

2. A high frequency multichannel communications system as claimed in claim 1 wherein the receiver is synchronised to the received signal.

3. A high frequency multichannel communications system as claimed in claim 1 wherein the data rate is selected such that dispersion effects during transmission from the transmitter to the receiver does not lead to intersymbol interference.

4. A high frequency multichannel communications system as claimed in claim 3 wherein said digital signal data is transmitted at a baud rate between 20 and 100 per sec.

5. A high frequency multichannel communications system as claimed in claim 4 wherein the baud rate is 50 bps.

6. A high frequency multichannel communications system as claimed in claim 1 wherein the transmitted signal has a number of phase states greater than two.

7. A high frequency multichannel communications system having at least a transmitter and a receiver:
   said transmitter comprising:
   a) input means for receiving digital signal data for transmission of transmitted data bits;
   b) the input means, connected to a plurality of separate diversity frequency channels distributed over a broad spectral region of a high frequency band, each channel including a differential phase shift key (DPSK) modulator, for modulating a channel frequency, by successive bits of the digital signal data at a low data rate to produce a DPSK channel signal; and
   c) means for combining the DPSK channel signals from each of the plurality of separate diversity frequency channels for transmission; and
   wherein said receiver comprising:
   a) receiver means for receiving and demodulating the transmitted signals to form baseband signals;
   b) said baseband signals from the receiver means being connected to a plurality of narrowband receiver frequency channels, each receiver frequency channel including a DPSK detector responsive to a respective one of the transmitted DPSK channel frequency signals;
   c) means for identifying any of said receiver frequency channels corrupted by noise; and
   d) semi-coherent processing means, responsive to each transmitted data bit, for vectorially adding DPSK detector output signals, excluding said channels corrupted by noise and for producing a combined vector signal phase for determining polarity of each transmitted data bit as a data output signal, wherein there is included a channel exciser for excising channels identified as noise corrupted channels.

8. A high frequency multichannel communications system having at least a transmitter and a receiver:
   said transmitter comprising:
   a) input means for receiving digital signal data for transmission of transmitted data bits:
   b) the input means, connected to a plurality of separate diversity frequency channels distributed over a broad spectral region of a high frequency band, each channel including a differential phase shift key (DPSK) modulator, for modulating a channel frequency by successive bits of the digital signal data at a low data rate to produce a DPSK channel signal; and
   c) means for combining the DPSK channel signals from each of the plurality of separate diversity frequency channels for transmission; and
   wherein said receiver comprising:
   a) receiver means for receiving and demodulating the transmitted signals to form baseband signals;
   b) said baseband signals from the receiver means being connected to a plurality of narrowband receiver frequency channels, each receiver frequency channel including a DPSK detector responsive to a respective one of the transmitted DPSK channel frequency signals;
   c) means for identifying any of said receiver frequency channels corrupted by noise; and
   d) semi-coherent processing means, responsive to each transmitted data bit, for vectorially adding DPSK detector output signals, excluding said channels corrupted by noise and for producing a combined vector signal phase for determining polarity of each transmitted data bit as a data output signal wherein said DPSK modulator is an M phase DPSK modulator which produces an M phase DPSK channel signal where M is an integer and the means for identifying noise-corrupted channels includes a phase window detector having M phase windows of width $<360/M$ deg centered on M phase states.

9. A high frequency multichannel communications system as claimed in claim 8 wherein a HIT is when a detected phase falls within a phase window and a MISS is when a detected phase falls outside a phase window, including a counter connected to each channel for providing, over a predetermined time, a first signal indicative of a running average of HITS for each channel and a second signal representing the proportion of HITs to MISSes said first and second signals connected to a discriminator for determining whether the channel is noise corrupted.

10. A high frequency multichannel communications system as claimed in claim 9 wherein each phase window is 360/2M deg and said discriminator provides an output indicating a channel to be uncorrupted by noise when said second signal indicates that the proportion of HITs to Misses is above 1.

11. A high frequency multichannel communications system as claimed in claim 10 wherein the proportion of HITs to MISSes in each channel and the number of phase windows taken to measure the proportion are selected with reference to a channel signal-to-noise (S/N) ratio and a predetermined probability of correct identification of channel corruption.

12. A high frequency multichannel communications system as claimed in claim 11, wherein the resultant vector signal phase for each phase window is connected to a PSK decoder for providing said data output signal.

13. A high frequency multichannel communications system having at least a transmitter and a receipt;
said transmitter comprising:
a) input means for receiving digital signal data for transmission Of transmitted data bits:
b) the input means, connected to a plurality of Separate diversity frequency channels distributed over a broad spectral region of a high frequency band, each channel including a differential phase shift key (DPSK) modulator, for modulating a channel frequency by successive bits Of the digital signal data at a low data rate to produce a DPSK channel signal; and
c) means for combining the DPSK channel signals from each of the plurality of separate diversity frequency channels for transmission; and
wherein said receiver comprising:
a) receiver means for receiving and demodulating the transmitted signals to form baseband signals;
b) said baseband signals from the receiver means being connected to a plurality of narrowband receiver frequency channels, each receiver frequency channel including a DPSK detector responsive to a respective one of the transmitted DPSK channel frequency signals:
c) means for identifying any of said receiver frequency channels corrupted by noise; and
d) semi-coherent processing means, responsive to each transmitted data bit, for vectorially adding DPSK detector output signals, excluding said channels corrupted by noise and for producing a combined vector signal phase for determining polarity of each transmitted data bit as a data output signal wherein the plurality of narrowband channels in the receiver are arranged into contiguous broader bandwidth groups where the channels of each group are connected to a respective coherent adder for coherently adding uncorrupted channel signals and the adder outputs are connected to the semi-coherent processing means for vectorially adding the adder outputs.

14. A high frequency multichannel communications system as claimed in claim 13 where each group has a bandwidth less than 2 kHz.

15. A high frequency multichannel communications system as claimed in claim 14, further including first and second channel excisers, wherein in said means for identifying channels corrupted by noise, the DPSK channel signal detected in each receiver channel is connected to first and second channel excisers and to an error detector; the output from said error detector being connected to said first and second channel excisers for excising noise-corrupted channels; the first exciser being connected through a semi-coherent channel vector summer and through a PSK detector to a data output and the second exciser being connected via a second semi-coherent vector summer for providing an estimated combined vector signal phase input signal to a second input of said error detector.

16. A high frequency multichannel communications system as claimed in claim 15 wherein of an excision decorrelator is connected to an input to the second exciser for preventing the number of excised channels from exceeding a pre-determined value.

17. A high frequency multichannel communications system having at least a transmitter and a receiver:
said transmitter comprising:
a) input means for receiving digital signal data for transmission of transmitted data bits:
b) the input means, connected to a plurality of separate diversity frequency channels distributed over a broad spectral region of a high frequency band, each channel including a differential phase shift key (DPSK) modulator, for modulating a channel frequency by successive bits of the digital signal data at a low data rate to produce a DPSK channel signal; and
c) means for combining the DPSK channel signals from each of the plurality of separate diversity frequency channels for transmission; and
wherein said receiver comprising:
a) receiver means for receiving and demodulating the transmitted signals to form baseband signals;
b) said baseband signals from the receiver means being connected to a plurality of narrowband receiver frequency channels, each receiver frequency channel including a DPSK detector responsive to a respective one of the transmitted DPSK channel frequency signals:
c) means for identifying and of said receiver frequency channels corrupted by noise; and
d) semi-coherent processing means, responsive to each transmitted data bit, for vectorially adding DPSK detector output signals, excluding said channels corrupted by noise and for producing a combined vector signal phase for determining polarity of each transmitted data bit as a data output signal wherein said vectorially added DPSK detector output signals are connected to each means for identifying channels corrupted by noise.

18. A high frequency multichannel communications system as claimed in claim 17, wherein the DPSK detector output signals in each channel are connected to one input of an error detector with an estimated combined vector signal phase being connected to a second input to the error detector, an output signal from the error detector is connected to an error counter, said error counter providing a noise corrupted channel output whenever a detected error rate exceeds a predetermined threshold.

19. A high frequency multichannel communications system as claimed in claim 18 wherein said error detector only provides an output if the detected phase signal is outside a pre-determined range centered on the combined vector phase signal.

20. A high frequency multichannel communications system having at least a transmitter and a receiver:
said transmitter comprising:
a) input means for receiving digital signal data for transmission of transmitted data bits:
b) the input means, connected to a plurality Of separate diversity frequency channels distributed over a broad spectral region of a high frequency band, each channel including a differential phase shift key (DPSK) modulator, for modulating a channel frequency by successive bits of the digital signal data at a low data rate to produce a DPSK channel signal; and
c) means for combining the DPSK channel signals from each of the plurality of separate diversity frequency channels for transmission: and
wherein said receiver comprising.:
a) receiver means for receiving and demodulating the transmitted signals to form baseband signals;
b) said baseband signals from the receiver means being connected to a plurality of narrowband receiver frequency channels, each receiver frequency channel including a DPSK detector responsive to a respective one of the transmitted DPSK channel frequency signals;
c) means for identifying any of said receiver frequency channels corrupted by noise; and
d) semi-coherent processing means, responsive to each transmitted dam bit, for vectorially adding DPSK detector output signals, excluding said channels corrupted by noise and for producing a combined vector signal phase for determining polarity of each transmitted data bit as a data output signal wherein the transmitter includes a demultiplexer [(1101)]responsive to the digital signal data for providing at respective outputs demultiplexed portions of said signal data, said plurality of separate frequency channels are divided into groups of different frequency channels, each group connected to a respective demultiplexed portion of said signal data and each channel transmitting at a low data rate between 20-100 bps and the receiver includes a multiplexer to reproduce the transmitted data signal.

21. A high frequency multichannel communications system as claimed in claim 20 wherein the channels of any one multiplexed group are interleaved with the channel of every other group.

22. A high frequency multichannel communications system having at least a transmitter and a receiver:
said transmitter comprising:
a) input means for receiving digital signal data for transmission of transmitted data bits:
b) the input means, connected to a plurality of separate diversity frequency channels distributed over a broad spectral region of a high frequency band, each channel including a differential phase shift key (DPSK) modulator for modulating a channel frequency by successive bits of the digital signal data at a low data rate to produce a DPSK channel signal; and
c) means for combining the DPSK channel signals from each of the plurality of separate diversity frequency channels for transmission; and
wherein said receiver comprising;
a) receiver means for receiving and demodulating the transmitted signals to form baseband signals;
b) said baseband signals from the receiver means being connected to a plurality of narrowband receiver frequency channels, each receiver frequency channel including a DPSK detector responsive to a respective one of the transmitted DPSK channel frequency signals;
c) means for identifying any of said receiver frequency channels corrupted by noise; and
d) semi-coherent processing means, responsive to each transmitted data bit, for vectorially adding DPSK detector output signals, excluding said channels corrupted by noise and for producing a combined vector signal phase for determining polarity of each transmitted data bit as a data output signal wherein the receiver means is connected to the receiver frequency channels via an analogue to digital converter connected to a Fast Fourier Transform (FFT) processor which has a number of frequency channels equal to the number of receiver frequency channels and the signal phase is detected in each receiver frequency channel.

23. A high frequency multichannel communications system having at least a transmitter and a receiver;
said transmitter comprising:
a) input means for receiving digital signal data for transmission of transmitted data bits:
b) the input means, connected to a plurality of Separate diversity frequency channels distributed over a broad spectral region of a high frequency band, each channel including a differential phase shift key (DPSK) modulator, for modulating a channel frequency by successive bits of the digital signal data at a low data rate to produce a DPSK channel signal; and
c) means for combining the DPSK channel signals from each of the plurality of separate diversity frequency channels for transmission; and.
wherein said receiver comprising:
a) receiver means for receiving and demodulating the transmitted signals to form baseband signals;
b) said baseband signals from the receiver means being connected to a plurality of narrowband receiver frequency channels, each receiver frequency channel including a DPSK detector responsive to a respective one of the transmitted DPSK channel frequency signals;
c) means for identifying any of said receiver frequency channels corrupted by noise; and
d) semi-coherent processing means, responsive to each transmitted data bit, for vectorially adding DPSK detector output signals, excluding said channels corrupted by noise and for producing a combined vector signal phase for determining polarity of each transmitted data bit as a data output signal wherein the transmitter includes a pseudorandom number generator (PNG) connected to the means for combining the DPSK channel signals for modulating the combined channel signals with a pseudorandom code and said receiver includes a demodulator connected to the same coherent processing means for demodulating the transmitted data signal.

24. A high frequency multichannel communications system as claimed in claim 23 wherein in the transmitter the DPSK channel signals are generated at 1 bps and the pseudorandom code is generated at 50 bps and in the receiver the received signal is summed over 1 sec intervals for every 50 received bits to determine the transmitted data bit polarities.

* * * * *